(12) United States Patent
Hu et al.

(10) Patent No.: US 12,267,525 B2
(45) Date of Patent: Apr. 1, 2025

(54) VIDEO PROCESSING METHOD AND APPARATUS, DEVICE, AND STORAGE MEDIUM

(71) Applicant: Tencent Technology (Shenzhen) Company Limited, Guangdong (CN)

(72) Inventors: Ying Hu, Shenzhen (CN); Xiaozhong Xu, State College, PA (US); Shan Liu, San Jose, CA (US)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 155 days.

(21) Appl. No.: 17/950,619

(22) Filed: Sep. 22, 2022

(65) Prior Publication Data

US 2023/0022526 A1     Jan. 26, 2023

Related U.S. Application Data

(63) Continuation of application No. PCT/CN2021/112353, filed on Aug. 12, 2021.

(30) Foreign Application Priority Data

Aug. 23, 2020   (CN) .......................... 202010853261.3

(51) Int. Cl.
*H04N 19/136* (2014.01)
*H04N 19/573* (2014.01)

(52) U.S. Cl.
CPC ......... *H04N 19/573* (2014.11); *H04N 19/136* (2014.11)

(58) Field of Classification Search
None
See application file for complete search history.

(56) References Cited

U.S. PATENT DOCUMENTS

| 2012/0033743 A1 | 2/2012 | Basso et al. |
| 2014/0280303 A1 | 9/2014 | Jain et al. |
| 2021/0344903 A1* | 11/2021 | Yu ........................ H04N 19/184 |

FOREIGN PATENT DOCUMENTS

| CN | 109005426 A | 12/2018 |
| CN | 110876051 A | 3/2020 |
| CN | 110876083 A | 3/2020 |
| CN | 110876084 A | 3/2020 |
| CN | 110996137 A | 4/2020 |

(Continued)

OTHER PUBLICATIONS

International Search Report and Written Opinion issued Nov. 1, 2021 in International Application No. PCT/CN2021/112353 with English Translation (8 pages).

(Continued)

*Primary Examiner* — Christopher G Findley
(74) *Attorney, Agent, or Firm* — ArentFox Schiff LLP

(57) ABSTRACT

A video processing method is provided. In the method, a video bit stream is obtained. Configuration information of the video bit stream is determined. The configuration information includes reference image information. The reference image information indicates (i) whether a video track corresponding to the video bit stream includes a reference image and (ii) whether the video track requires reference to the reference image. The video bit stream and the configuration information are encapsulated to obtain the video track.

16 Claims, 9 Drawing Sheets

(56) References Cited

FOREIGN PATENT DOCUMENTS

| | | | |
|---|---|---|---|
| CN | 111416976 A | 7/2020 | |
| CN | 111526368 A | 8/2020 | |
| EP | 3866478 A1 * | 8/2021 | ............ H04N 19/70 |
| WO | 2020143594 A1 | 7/2020 | |

OTHER PUBLICATIONS

Chinese Office Action issued Jul. 14, 2022 in Application No. 202010853261.3 with Concise English Translation (10 pages).
Supplementary European Search Report issued Dec. 1, 2023 in Application No. 21860164.9 (11 pages).
Xuehui Wang et al: "Carriage of AVS video in the ISO Base Media File Format", 127. MPEG Meeting; Jul. 8, 2019-Jul. 12, 2019; Gothenburg; (Motion Picture Expert Group or ISO/IEC JTC1/SC29/WG11), No. m49649, Jul. 6, 2019, 3 pages.

* cited by examiner

VIDEO PROCESSING METHOD AND APPARATUS, DEVICE, AND STORAGE MEDIUM

RELATED APPLICATIONS

The present application is a continuation of International Application No. PCT/CN2021/112353, entitled "VIDEO PROCESSING METHOD AND APPARATUS, DEVICE, AND STORAGE MEDIUM" and filed on Aug. 12, 2021, which claims priority to Chinese Patent Application No. 202010853261.3, entitled "VIDEO PROCESSING METHOD AND APPARATUS, DEVICE, AND STORAGE MEDIUM" and filed on Aug. 23, 2020. The entire disclosures of the prior applications are hereby incorporated by reference in their entirety.

FIELD OF THE TECHNOLOGY

This application relates to the field of audio and video technologies, including to a video processing method and apparatus, a device, and a storage medium.

BACKGROUND OF THE DISCLOSURE

A video signal refers to an image sequence including multiple frames. Because the data bandwidth of digitized video signals is very high, it is difficult for computer devices to directly store and process the digitized video signals, so it is necessary to use video compression technologies to reduce the data bandwidth of video signals.

Video compression technologies are realized by video coding. In some mainstream video coding technologies, a hybrid coding framework is used to perform a series of operations and processing on an inputted original video signal. At the encoder end, an encoder performs block partition structure, predictive coding, transform and quantization, entropy coding or statistical coding, and the like on the inputted original video signal (video sequence) to obtain a video bit stream. The obtained video bit stream is encapsulated to obtain a video track, and the video track is further encapsulated to obtain a video file, so that the video file is stored in the encoder in a structure that is easier to parse. At the decoder end, the decoder needs to perform inverse operations such as decapsulation and decoding on encoded images to present the video content.

In the related art, the encoder may use different coding policies to encode a video sequence to obtain different video bit streams.

SUMMARY

Embodiments of this disclosure provide a video processing method and apparatus, a device, and a storage medium, to improve the storage, association, and transmission efficiency of video tracks. The technical solutions are as follows.

According to an aspect, a video processing method is provided. In the method, a video bit stream is obtained. Configuration information of the video bit stream is determined. The configuration information includes reference image information. The reference image information indicates (i) whether a video track corresponding to the video bit stream includes a reference image and (ii) whether the video track requires reference to the reference image. The video bit stream and the configuration information are encapsulated to obtain the video track.

According to another aspect, a video processing method is provided. In the method, a video file of a target video is obtained. The video file is decapsulated to obtain a video track of the target video. The video track is decapsulated to obtain a video bit stream of the target video and configuration information of the video bit stream. The configuration information includes reference image information. The reference image information indicates (i) whether the video track includes a reference image and (ii) whether the video track requires reference to the reference image. The video bit stream is decoded to obtain a video sequence of the target video.

According to still another aspect, a video processing apparatus including processing circuitry is provided. The processing circuitry is configured to obtain a video bit stream, and determine configuration information of the video bit stream. The configuration information includes reference image information. The reference image information indicates (i) whether a video track corresponding to the video bit stream includes a reference image and (ii) whether the video track requires reference to the reference image. The processing circuitry is configured to encapsulate the video bit stream and the configuration information to obtain the video track.

According to yet another aspect, a video processing apparatus including processing circuitry is provided. The processing circuitry is configured to obtain a video file of a target video and decapsulate the video file to obtain a video track of the target video. The processing circuitry is configured to decapsulate the video track to obtain a video bit stream of the target video and configuration information of the video bit stream. The configuration information includes reference image information. The reference image information indicates (i) whether the video track includes a reference image and (ii) whether the video track requires reference to the reference image. The processing circuitry is configured to decode the video bit stream to obtain a video sequence of the target video.

According to a further aspect, the embodiments of this disclosure provide a computer device, including a processor and a memory, the memory storing at least one instruction, at least one program, a code set, or an instruction set, the at least one instruction, the at least one program, the code set, or the instruction set being loaded and executed by the processor to implement any of the video processing methods.

According to a further aspect, the embodiments of this disclosure provide a non-transitory computer-readable storage medium, storing instructions which when executed by a processor cause the processor to perform any of the video processing methods.

According to a further aspect, the embodiments of this disclosure provide a computer program product or a computer program. The computer program product or the computer program includes computer instructions, the computer instructions being stored in a computer-readable storage medium. A processor of a computer device reads the computer instructions from the computer-readable storage medium, and executes the computer instructions, so that the computer device executes any of the video processing methods.

Technical solutions provided in the embodiments of this disclosure may bring the following beneficial effects:

In the process of encapsulating a video bit stream to obtain a video track, configuration information of the video bit stream is added to indicate a coding characteristic of the video bit stream, so as to facilitate the classification and storage of the video track, the association between different video tracks, and the quick obtaining of the video track with a certain coding characteristic, thereby improving the storage, association, and transmission efficiency of video tracks. In addition, in the embodiments of this disclosure, the configuration information of the video bit stream includes knowledge image information. Since the concept of knowledge image is first introduced for video coding in the AVS technology, the embodiments of this disclosure provide a file encapsulation method indicating a coding characteristic of the AVS encoding technology for the AVS technology.

BRIEF DESCRIPTION OF THE DRAWINGS

To describe the technical solutions in the embodiments of this disclosure more clearly, the following briefly introduces the accompanying drawings required for describing the embodiments. The accompanying drawings in the following description show only some embodiments of this disclosure, and other embodiments are within the scope of this disclosure.

DESCRIPTION OF EMBODIMENTS

To make objectives, technical solutions, and advantages of this disclosure clearer, the following further describes implementations of this disclosure in further detail with reference to the accompanying drawings.

Figure 1:
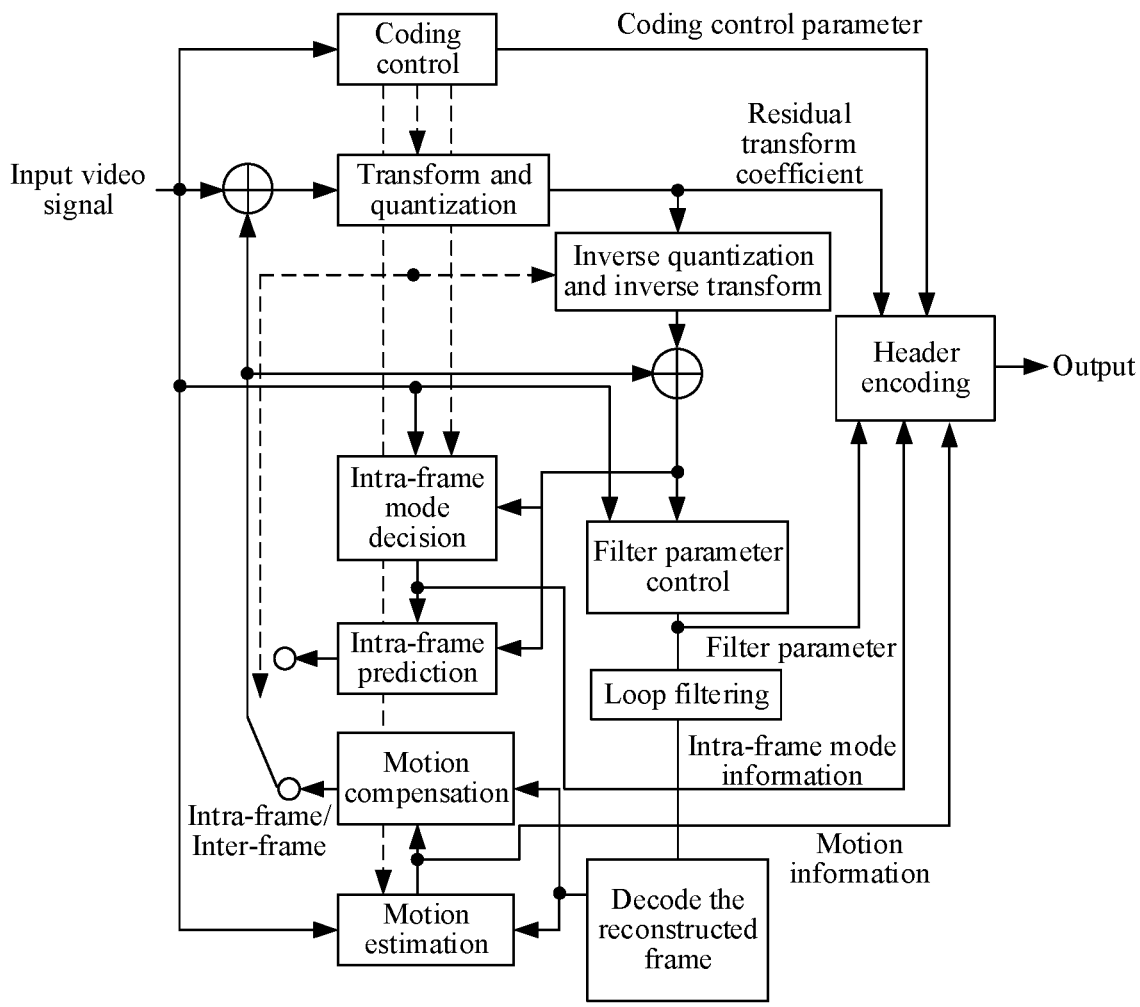
FIG. 1 is a schematic diagram of a video coding process according to an embodiment of this disclosure.

First, a video coding technology is briefly introduced with reference to FIG. 1. FIG. 1 is a schematic diagram of a video coding process according to an embodiment of this disclosure.

A video signal refers to an image sequence including one or more frames. A frame is a representation of spatial information of a video signal. A YUV mode is used as an example, and one frame includes a brightness sample matrix (Y) and two chroma sample matrices (Cb and Cr). From a perspective of an obtaining manner of a video signal, the obtaining manner may be divided into two manners: camera capturing and computer generation. Due to different statistical characteristics, corresponding compression coding manners may also be different.

In some modern mainstream video coding technologies such as an H.265/high efficient video coding (HEVC) standard, an H.266/versatile video coding (VVC) standard, and an audio video coding (AVS) standard (e.g., AVS3), a series of operations and processing are performed on an inputted original video signal by using a hybrid coding framework as follows:

(1) Block partition structure: An inputted image is partitioned into a plurality of non-overlapping processing units, and similar compression operations are performed on all the processing units. The processing unit is referred to as a coding tree unit (CTU) or a largest coding unit (LCU). Each CTU may further continue to be divided more finely into one or more basic coding units, which are referred to as coding units (CUs). Each CU is the most basic element in an encoding process. When performing prediction, the CU further needs to be divided into different predict units (PUs). Various possible encoding modes for each CU are described below.

(2) Predictive coding: The predictive coding includes modes such as intra prediction and inter prediction. After an original video signal is predicted by using a selected reconstructed video signal, a residual video signal is obtained. An encoding terminal needs to select a most suitable one from many possible predictive coding modes, and informs a decoding terminal. Intra prediction: A predicted signal comes from a region in a same image that has been encoded and reconstructed. Inter prediction: A predicted signal comes from another image (referred to as a reference image) that has been encoded and that is different from a current image.

3. Transform & Quantization: A residual video signal is transformed into a transform domain through a transform operation such as discrete fourier transform (DFT) or discrete cosine transform (DCT), to generate a transform coefficient. A lossy quantization operation is further performed on the signal in the transform domain, which loses a specific amount of information, so that the quantized signal is conducive to compressed expression. In some video coding standards, there may be more than one transform manner for selection. Therefore, an encoding terminal also needs to select one of the transform manners for a current CU, and inform a decoding terminal. The fineness of quantization is generally determined by a quantization parameter. If a value of the QP is larger, it indicates that coefficients in a larger value range are quantized into a same output. Therefore, larger distortion and a lower code rate are generally caused. Conversely, a smaller value of the QP represents that coefficients within a smaller range will be quantized as a same output, and therefore, may usually bring a smaller distortion while corresponding to a higher bit rate.

(4) Entropy coding or statistical coding: Statistical compression coding is performed quantized transform domain signals according to frequencies of occurrence of values, and finally, a binarized (0 or 1) compressed bitstream (or referred to as "a video bit stream", and for ease of description, generally referred to as "video bit stream") is outputted. In addition, other information such as a selected mode and a motion vector is generated through encoding, and entropy coding is also needed to reduce a code rate. Statistical coding is a lossless coding mode that can effectively reduce a bit rate required for expressing a same signal. Common statistical coding modes include variable length coding (VLC) or content adaptive binary arithmetic coding (CABAC).

(5) Loop filtering: Operations of inverse quantization, inverse transform, and prediction compensation (reverse operations of the foregoing operations 2 to 4) are performed on an image that has been encoded, to obtain a reconstructed decoded image. Compared with an original image, a reconstructed image has some information different from that of the original image due to impact of quantization, resulting in a distortion. Performing a filtering operation, for example, deblocking, sample adaptive offset (SAO) filtering, or adaptive loop filter (ALF) filtering, on the reconstructed image can effectively reduce a degree of distortion produced by quantization. Because the filtered reconstructed image is used as a reference for subsequently encoding an image and is used for predicting a future signal, the foregoing filtering operation is also referred to as loop filtering or referred to as a filtering operation in an encoding loop.

It can be learned from the description that in the decoding side, after obtaining a compressed bitstream, the decoder performs entropy decoding, to obtain various mode information and quantized transform coefficients and then inverse quantization and inverse transform are performed on the coefficients, to obtain a residual signal. On the other hand, a predicted signal corresponding to the CU may be obtained according to the known encoding mode information. After the residual signal of the CU and the prediction signal are added, a reconstructed signal of the CU may be obtained. A loop filtering operation needs to be performed on a reconstructed value of the decoded image before a final output signal is generated.

Figure 2:
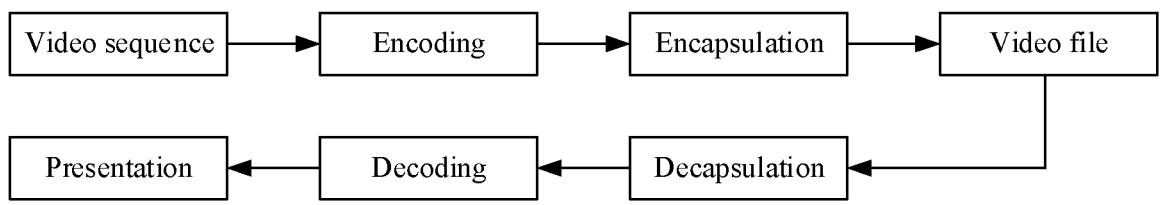
FIG. 2 is a flowchart of a video coding process according to an embodiment of this disclosure.

In an example, for a video bit stream obtained through encoding, the video bit stream is encapsulated to obtain a video track, and the video track is further encapsulated to obtain a video file, so that the video file is stored in a computer device in a structure that is easier to parse. As shown in FIG. 2, after a video sequence is encoded, the obtained video bit stream needs to be encapsulated and transmitted to a user side. On the user side, inverse operations such as decapsulation and decoding need to be performed to present the video content.

Information added in the encapsulation step of the video bit stream generally may help improve the storage, association, and transmission efficiency of the video file on a server or an intermediate transmission node and the efficiency of decoding the video file on the user side. However, for the novel video coding technology proposed by AVS, there is no corresponding file encapsulation method in the related art yet. Therefore, the embodiments of this disclosure provide a video processing method, which can be used to add information indicating a coding characteristic in the file encapsulation step. In addition, the information added in the file encapsulation step in the embodiments of this disclosure may be used for indicating a unique coding characteristic of AVS, so as to improve the storage, association, and transmission efficiency of a video bit stream obtained by AVS encoding in a server or an intermediate transmission node and the efficiency of decoding the video bit stream on the user side.

The video processing method provided in the embodiments of this disclosure may be applicable to AVS (e.g., AVS3) or next-generation video codec standards, which is not limited in the embodiments of this disclosure.

Figure 3:
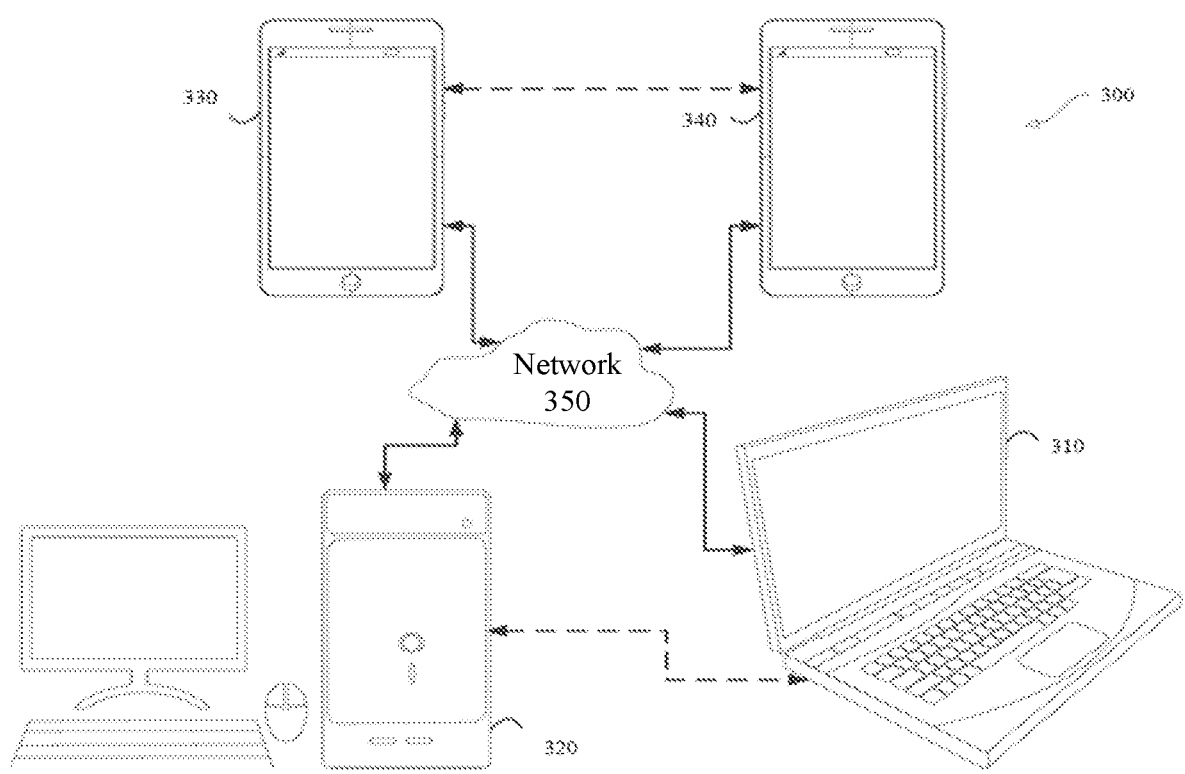
FIG. 3 is a block diagram of a communication system according to an embodiment of this disclosure.

FIG. 3 is a simplified block diagram of a communication system according to an embodiment of this disclosure. The communication system 300 includes a plurality of devices. The devices can communicate with each other via, for example, a network 350. For example, the communication system 300 includes a first device 310 and a second device 320 interconnected by the network 350. In the embodiment of FIG. 3, the first device 310 and the second device 320 execute a one-way data transmission. For example, the first device 310 may encode video data, for example, a video picture stream captured by the first device 310, and transmit the encoded video data to the second device 320 via the network 350. The encoded video data is transmitted in the form of one or more encoded video bit streams. The second device 320 may receive the encoded video data from the network 350, decode the encoded video data to restore the video data, and display the video pictures according to the restored video data. One-way data transmission is common in applications such as media services.

In another embodiment, the communication system 300 includes a third device 330 and a fourth device 340 configured to perform two-way transmission of encoded video data. The two-way transmission may occur, for example, during a video conference. For two-way data transmission, each of the third device 330 and the fourth device 340 may encode video data (e.g., a video picture stream captured by the devices), and transmit the encoded video data to the other one of the third device 330 and the fourth device 340 via the network 350. Each of the third device 330 and the fourth device 340 may further receive encoded video data transmitted by the other one of the third device 330 and the fourth device 340, decode the encoded video data to restore the video data, and display a video picture on an accessible display device according to the restored video data.

In the embodiment of FIG. 3, the first device 310, the second device 320, the third device 330, and the fourth device 340 may be computer devices such as servers, personal computers, and smart phones, but the principles disclosed in this disclosure are not limited thereto. The embodiments of this disclosure are applicable to a personal computer (PC), a mobile phone, a tablet computer, a media player, and/or a special video conference device. The network 350 represents any number of networks that communicate encoded video data between the first device 310, the second device 320, the third device 330, and the fourth device 340, including, for example, wired and/or wireless communication networks. The communication network 350 may exchange data in circuit-switched and/or packet-switched channels. The network may include a telecommunications network, a local area network, a wide area network, and/or the Internet. For the purposes of this disclosure, unless explained below, the architecture and topology of the network 350 may be inessential to the operations disclosed in this disclosure.

Figure 4:
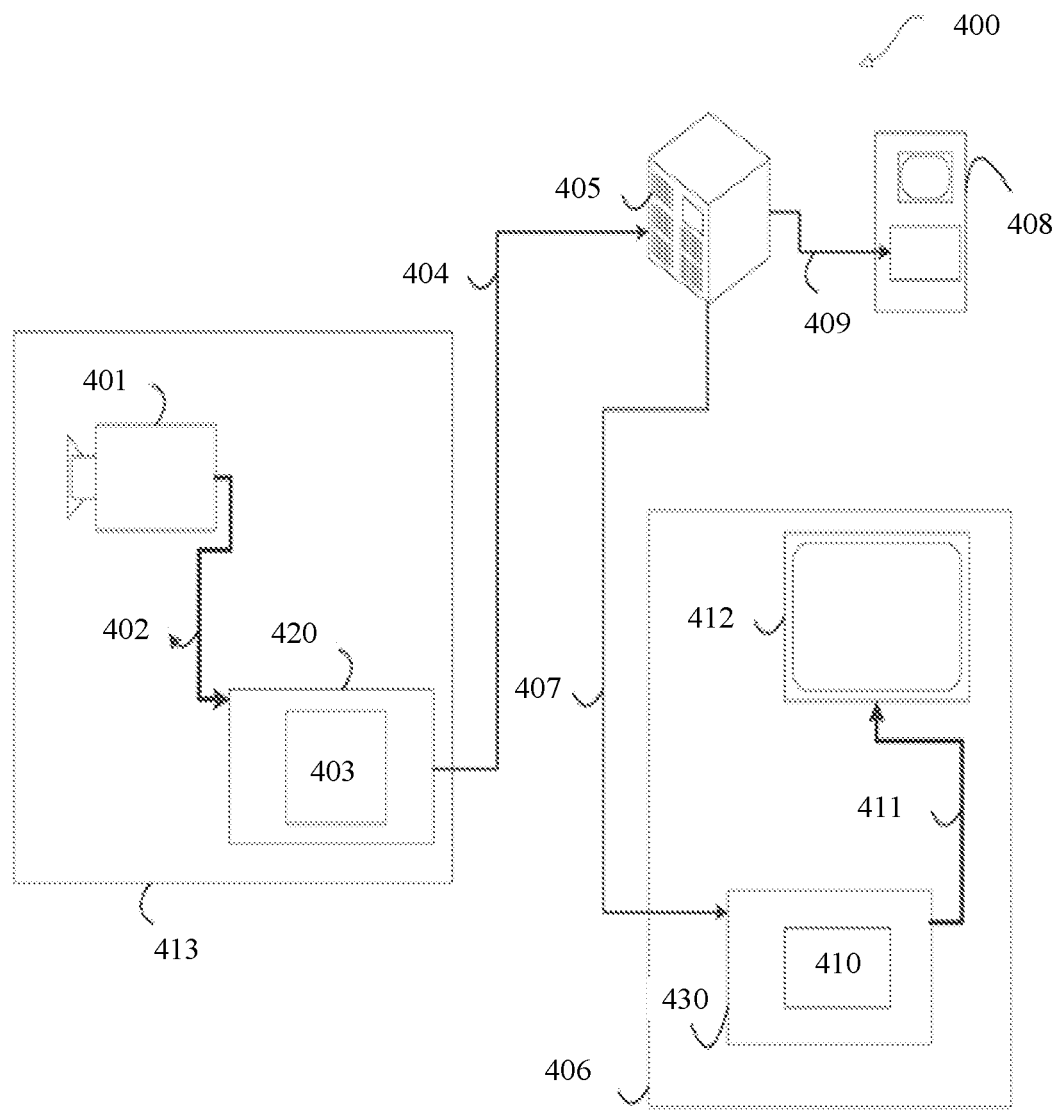
FIG. 4 is a block diagram of a streaming transmission system according to an embodiment of this disclosure.

As an embodiment, FIG. 4 shows an arrangement of a video encoder and a video decoder in a streaming transmission environment. The subject matter disclosed in this disclosure is equally applicable to other video-supporting applications including, for example, videoconferencing, digital television (TV), storage of a compressed video on a digital medium such as a compact disc (CD), a digital versatile disc (DVD), or a memory stick, etc.

A streaming transmission system may include a capture subsystem 413. The capture subsystem may include a video source 401, such as a digital camera. The video source is configured to create an uncompressed video picture stream 402. In an embodiment, the video picture stream 402 includes a sample captured by a digital camera. Compared to encoded video data 404 (or encoded video bit stream), the video picture stream 402 is denoted by a thick line to emphasize the high data volume of the video picture stream. The video picture stream 402 may be processed by an electronic device 420. The electronic device 420 includes a video encoder 403 coupled to the video source 401. The video encoder 403 may include hardware, software, or a combination of hardware and software to implement or practice various aspects of the disclosed subject matter as described in further detail below. The video encoder 403 may be a computer device. The computer device refers to an electronic device with data computing, processing, and storage capabilities, such as a PC, a mobile phone, a tablet computer, a media player, a special video conference device, a server, and the like. The video encoder 403 based on the method provided in this disclosure may be implemented by one or more processors or one or more integrated circuits.

Compared to the video picture stream 402, the encoded video data 404 (or encoded video bit stream 404) is denoted by a thin line to emphasize the low data amount of the encoded video data 404 (or encoded video bit stream 404), and may be stored on the streaming transmission server 405 for future use. One or more streaming transmission client subsystems, such as a client subsystem 406 and a client subsystem 408 in FIG. 4, may access the streaming transmission server 405 to retrieve copies 407 and 409 of the encoded video data 404. The client subsystem 406 may include, for example, a video decoder 410 in an electronic device 430. The video decoder 410 is configured to decode the inputted copy 407 of the encoded video data and produce an output video picture stream 411 that can be presented on a display 412 (e.g., a display screen) or another presentation device (not shown). In some streaming transmission systems, the encoded video data 404, the copy 407, and the copy 409 (e.g., video bit streams) may be encoded according to certain video encoding/compression standards.

The electronic device 420 and the electronic device 430 may include other components (not shown). For example, the electronic device 420 may include a video decoder (not shown), and the electronic device 430 may further include a video encoder (not shown). The video decoder is configured to decode received encoded video data. The video encoder is configured to encode video data.

The technical solutions of this disclosure will be described through several embodiments.

Figure 5:
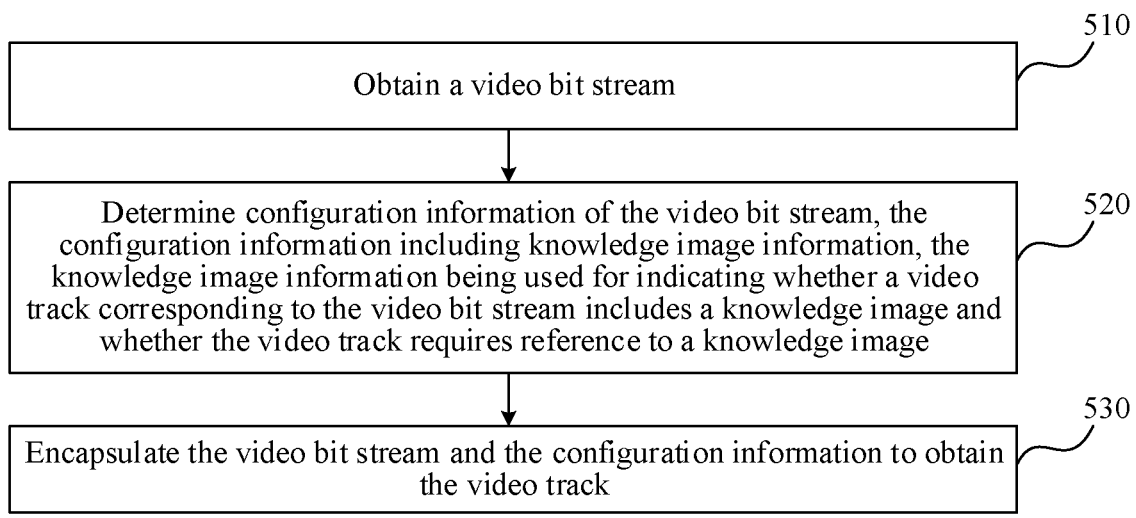
FIG. 5 is a flowchart of a video processing method according to an embodiment of this disclosure.

FIG. 5 is a flowchart of a video processing method according to an embodiment of this disclosure. The method may be applied to a computer device for encoding a video sequence such as a server or a terminal, for example, the first device 310 in the communication system shown in FIG. 3. The method is, for example, executed by a server in the following embodiment, but this disclosure is not limited thereto. In some implementations, the method may also be applied to other devices such as a terminal. The method may include the following steps (steps 510-530):

In step 510, a video bit stream is obtained.

The video bit stream is obtained by encoding a video sequence. The video sequence refers to an image sequence including one or more frames (or referred to as encoded images). In the embodiments of this disclosure, a server may obtain a video sequence, and encode the video sequence to obtain a video bit stream. The video bit stream is also referred to as a bitstream, and refers to a binary data stream formed by encoding an image.

The server may encode the video sequence according to different coding policies to obtain different video bit streams. In an example, the coding policies include at least one of: a profile of the video bit stream, a level of the video bit stream, a chroma format of the video bit stream, sample precision of a luminance sample and a chroma sample of the video bit stream, a frame rate of the video bit stream, whether a video track corresponding to the video bit stream includes a knowledge image, or whether the video track corresponding to the video bit stream requires reference to a knowledge image. The knowledge image refers to a reference image used during decoding of the current video bit stream, and is different from the current video bit stream.

The manner in which the coding policy is determined is not limited in the embodiments of this disclosure. In an example, the coding policy is determined by the server according to the video sequence. For example, the server determines the coding policy according to the number of frames in the video sequence. For example, for a video sequence with a large number of frames, the server determines to encode the video sequence at a low frame rate. In an example, the coding policy is determined by the server according to a coding capability of the server. Based on this, in an example, before step 510, the method further includes: obtaining coding capability information; determining the coding policy according to the coding capability information; and coding the video sequence according to the coding policy to obtain the video bit stream. The coding capability information is used for indicating a coding capability of the encoding device of the video sequence (i.e. the server). The server may obtain its own coding capability information and further determine the coding policy according to the coding capability information. The content of the coding capability information is not limited in the embodiments of this disclosure. In an example, the coding capability information includes a computing speed, computing precision, storage space, and the like. For example, a server with high computing precision may determine to encode the video sequence based on high sample precision. By using different coding policies to encode the video sequence, the profile, level, and the like of the video bit stream can be enriched.

In step 520, configuration information of the video bit stream is determined, the configuration information being used for indicating a coding characteristic of the video bit stream, the configuration information including knowledge image information, the knowledge image information being used for indicating whether a video track corresponding to the video bit stream includes a knowledge image and whether the video track requires reference to a knowledge image. In an example, the configuration information includes reference image information. The reference image information indicates (i) whether a video track corresponding to the video bit stream includes a reference image and (ii) whether the video track requires reference to the reference image.

It can be seen from the above embodiments that, information added in the encapsulation step of the video bit stream generally helps improve the storage, association, and transmission efficiency of the video file on a server or an intermediate transmission node and the efficiency of decoding the video file on the client side. Based on this, in the embodiments of this disclosure, after encoding the video sequence to obtain the video bit stream, the server further determines the configuration information of the video bit stream, so as to add the configuration information in the encapsulation step of the video bit stream.

The configuration information of the video bit stream is used for indicating the coding characteristic of the video bit stream, for example, an encoding/decoding configuration of the video bit stream, a version configuration of the video bit stream, and the like. In the embodiments of this disclosure, the configuration information of the video bit stream includes knowledge image information, the knowledge image information being used for indicating whether a video track corresponding to the video bit stream includes a knowledge image and whether the video track requires reference to a knowledge image. The knowledge image refers to a reference image used during decoding of the current video bit stream, and is different from the current video bit stream. Since the concept of knowledge image is first introduced for video coding in the AVS technology, the embodiments of this disclosure provide a file encapsulation method indicating a coding characteristic of the AVS encoding technology for the AVS technology, and enrich the content of the configuration information.

The manner in which the knowledge image information is determined is not limited in the embodiments of this disclosure. In an example, the server determines the knowledge image information based on a video content of the video bit stream. Exemplarily, if the video content of the video bit stream is relatively complex or a scene of the video content changes a lot, the server determines that the video track corresponding to the video bit stream includes a knowledge image. In another example, the server determines the knowledge image information based on a degree of association between the video content of the video bit stream and a video content of another video bit stream. Exemplarily, in a scenario where there are many associations between the video content of the video bit stream and the video content of the another video bit stream, the server determines that the video track corresponding to the video bit stream requires reference to a knowledge image included in another video track. In still another example, the server determines the knowledge image information based on a duration, chroma, theme, etc. of the video content of the video bit stream.

In order to enrich the coding characteristic that the knowledge image information can indicate, different values may be assigned to the knowledge image information to indicate different coding characteristics (meanings). In an example, in response to a value of the knowledge image information being a first value, the knowledge image information is used for indicating that the video track does not include a knowledge image and the video track does not require reference to a knowledge image; in response to the value of the knowledge image information being a second value, the knowledge image information is used for indicating that the video track does not include a knowledge image and the video track requires reference to a knowledge image; in response to the value of the knowledge image information being a third value, the knowledge image information is used for indicating that the video track includes a knowledge image and the video track does not require reference to a knowledge image; and in response to a value of the knowledge image information being a fourth value, the knowledge image information is used for indicating that the video track includes a knowledge image and the video track requires reference to knowledge image. The first value, the second value, the third value, and the fourth value are different values. In other words, any two values among the first value, the second value, the third value, and the fourth value are not the same. In an example, the value of the knowledge image information is represented in binary form. Based on the four values of the knowledge image information shown in the above example, in the embodiments of this disclosure, a 2-bit unsigned integer may be used to represent the value of the knowledge image information, as shown in Table 1 below.

TABLE 1

Knowledge image information

| Value of knowledge image information | Meaning |
|---|---|
| 00 | the video track does not include a knowledge image and the video track does not require reference to a knowledge image |
| 01 | the video track does not include a knowledge image and the video track requires reference to a knowledge image |
| 10 | the video track includes a knowledge image and the video track does not require reference to a knowledge image |
| 11 | the video track includes a knowledge image and the video track requires reference to knowledge image |

In the embodiments of this disclosure, the video track corresponding to the video bit stream may be referred to as a first video track, a knowledge image included in the first video track may be referred to as a first knowledge image, and the first knowledge image is a knowledge image that another video track different from the first video track requires reference to. A knowledge image that the first video track requires reference to may be referred to as a second knowledge image. The second knowledge image is a knowledge image included in the another video track different from the first video track.

In step 530, the video bit stream and the configuration information of the video bit stream are encapsulated to obtain the video track.

After obtaining the video bit stream and the configuration information of the video bit stream, the server may add the configuration information of the video bit stream in the encapsulation step of the video bit stream to indicate the coding characteristic of the video bit stream. In the embodiments of this disclosure, after the video bit stream and the configuration information of the video bit stream are encapsulated, the video track can be obtained. In an example, the configuration information of the video bit stream is located at a sample entry corresponding to the video track in the form of a data box. For example, for the AVS coding technology, the sample entry corresponding to the video track (Avs3SampleEntry) may be obtained by extending a video sample entry, and the sample entry includes a data box Avs3ConfigurationBox. Exemplarily, the data box Avs3ConfigurationBox may be obtained by extending an ISOBMFF data box. The following shows a form of Avs3ConfigurationBox according to an embodiment of this disclosure:

```
class Avs3DecoderConfigurationRecord{
    unsigned int(8) configurationVersion;
    unsigned int(8) profile_id;
    unsigned int(8) level_id;
    bit(6) reserved = '111111'b;
    unsigned int(2) chroma_format;
    bit(5) reserved = '11111'b;
    unsigned int(3) sample_precision;
    bit(4) reserved = '1111'b;
    unsigned int(4) frame_rate_code;
    bit(6) reserved = '111111'b;
    unsigned int(2) library_indication;
```

```
}
class Avs3ConfigurationBox extends Box('av3c'){
    Avs3DecoderConfigurationRecord ( ) Avs3Config;
}
class Avs3SampleEntry( ) extends VisualSampleEntry ('av3e'){
    Avs3ConfigurationBox   config;
    MPEG4ExtensionDescriptorsBox ( );   // optional
}
```

The library_indication field is the knowledge image information. Reference may be made to the above embodiments for the description of the knowledge image information, which will not be repeated here. In addition, for the description of the semantics of other descriptive fields (configurationVersion, profile_id, level_id, chroma_format, sample_precision, frame_rate_code) included in the Avs3ConfigurationBox, reference may be made to the following embodiments, and will not be detailed here.

To sum up, in the technical solutions provided in the embodiments of this disclosure, in the process of encapsulating a video bit stream to obtain a video track, configuration information of the video bit stream is added to indicate a coding characteristic of the video bit stream, so as to facilitate the classification and storage of the video track, the association between different video tracks, and the quick obtaining of the video track with a certain coding characteristic, thereby improving the storage, association, and transmission efficiency of video tracks. In addition, since each video track includes the configuration information of the video bit stream, the server can quickly obtain a video track matching with the playback capability of the device where the client is located according to the configuration information, encapsulate the video track, and transmit the encapsulated video track to the client. Because the video track matches with the playback capability of the device where the client is located, the success rate of decoding can be ensured, thereby improving the decoding efficiency. In addition, in the embodiments of this disclosure, the configuration information of the video bit stream includes knowledge image information. Since the concept of knowledge image is first introduced for video coding in the AVS technology, the embodiments of this disclosure provide a file encapsulation method indicating a coding characteristic of the AVS encoding technology for the AVS technology.

In order to enrich the content of the configuration information, indicate the coding characteristics from multiple dimensions, and fully consider the influencing factors of the video bit stream, the configuration information of the video bit stream further includes other contents in the embodiments of this disclosure. The following describes the other contents included in the configuration information.

In an example, the configuration information further includes at least one of: profile label information, level label information, chroma format information, sample precision information, or frame rate indication information.

The profile label information is used for indicating a profile that the video bit stream conforms to. Exemplarily, the profile label information corresponds to the profile_id field in the Avs3ConfigurationBox. In order to enrich the coding characteristic that the profile label information can indicate, different values may be assigned to the profile label information to indicate different coding characteristics (profiles). For example, the profile label information is an 8-bit unsigned integer. As shown in Table 2 below, different values of the profile label information correspond to different profiles.

TABLE 2

| Profile label information | |
| --- | --- |
| Value of profile label information | Profile |
| 0x00 | Forbidden |
| 0x20 | Main 8-bit profile |
| 0x22 | Main 10-bit profile |
| 0x32 | High-performance 10-bit profile |
| Others | Reserved |

The level label information is used for indicating a level that the video bit stream conforms to. Exemplarily, the level label information corresponds to the level_id field in the Avs3ConfigurationBox. In order to enrich the coding characteristic that the level label information can indicate, different values may be assigned to the level label information to indicate different coding characteristics (levels). For example, the level label information is an 8-bit unsigned integer. As shown in Table 3 below, different values of the level label information correspond to different levels.

TABLE 3

| Level label information | |
| --- | --- |
| Value of level label information | Level |
| 0x00 | Forbidden |
| 0x10 | 2.0.15 |
| 0x12 | 2.0.30 |
| 0x14 | 2.0.60 |
| 0x20 | 4.0.30 |
| 0x22 | 4.0.60 |
| 0x40 | 6.0.30 |
| 0x42 | 6.2.30 |
| 0x44 | 6.0.60 |
| 0x46 | 6.2.60 |
| 0x48 | 6.0.120 |
| 0x4A | 6.2.120 |
| 0x50 | 8.0.30 |
| 0x52 | 8.2.30 |
| 0x54 | 8.0.60 |
| 0x56 | 8.2.60 |
| 0x58 | 8.0.120 |
| 0x5A | 8.2.120 |
| 0x60 | 10.0.30 |
| 0x62 | 10.2.30 |
| 0x64 | 10.0.60 |
| 0x66 | 10.2.60 |
| 0x68 | 10.0.120 |
| 0x6A | 10.2.120 |
| Others | Reserved |

The profile and the level provide a means of defining subsets of syntax and semantics. The profile and level impose various restrictions on the video bit stream, and also specify a decoder capability required for decoding a specific video bit stream. A profile is a subset of syntax, semantics, and algorithms. A decoder conforming to requirements of a profile needs to fully support a subset defined by the profile. A level is a set defining syntax elements and parameter values of the syntax elements under a certain profile. Under a given profile, different levels often mean different requirements for decoder capabilities and memory capacity.

The chroma format information is used for indicating a chroma format of the video bit stream. Exemplarily, the chroma format information corresponds to the chroma_format field in the Avs3ConfigurationBox. In order to enrich the coding characteristic that the chroma format information can indicate, different values may be assigned to the chroma format information to indicate different coding characteristics (chroma formats). For example, the chroma format information is a 2-bit unsigned integer. As shown in Table 4 below, different values of the chroma format information correspond to different chroma formats.

TABLE 4

Chroma format information

| Value of chroma format information | Chroma format |
|---|---|
| 00 | Reserved |
| 01 | 4:2:0 |
| 10 | Reserved |
| 11 | Reserved |

The sample precision information is used for indicating precision of a luminance sample and a chroma sample of the video bit stream. Exemplarily, the sample precision information corresponds to the sample_precision field in the Avs3ConfigurationBox. In order to enrich the coding characteristic that the sample precision information can indicate, different values may be assigned to the sample precision information to indicate different coding characteristics (levels). For example, the sample precision information is a 3-bit unsigned integer. As shown in Table 5 below, different values of the sample precision information correspond to different sample precisions.

TABLE 5

Sample precision information

| Value of sample precision information | Sample precision |
|---|---|
| 000 | Forbidden |
| 001 | The luminance sample and the chroma sample are both of 8-bit precision |
| 010 | The luminance sample and the chroma sample are both of 10-bit precision |
| 011-111 | Reserved |

The frame rate indication information is used for indicating a frame rate of the video bit stream. Exemplarily, the frame rate indication information corresponds to the frame_rate_code field in the Avs3ConfigurationBox. In order to enrich the coding characteristic that the frame rate indication information can indicate, different values may be assigned to the frame rate indication information to indicate different coding characteristics (frame rates). For example, the frame rate indication information is a 4-bit unsigned integer. As shown in Table 6 below, different values of the frame rate indication information correspond to different frame rates.

TABLE 6

Frame rate indication information

| Value of frame rate indication information | Frame rate |
|---|---|
| 0000 | Forbidden |
| 0001 | 24000/1001(23.976 . . .) |
| 0010 | 24 |
| 0011 | 25 |
| 0100 | 30000/1001(29.97 . . .) |
| 0101 | 30 |
| 0110 | 50 |
| 0111 | 60000/1001(59.94 . . .) |
| 1000 | 60 |
| 1001 | 100 |

TABLE 6-continued

Frame rate indication information

| Value of frame rate indication information | Frame rate |
|---|---|
| 1010 | 120 |
| 1011 | 200 |
| 1100 | 240 |
| 1101 | 300 |
| 1110-1111 | Reserved |

In another example, the configuration information further includes version configuration information, the version configuration information being used for indicating a current configuration version of the video bit stream. Exemplarily, the version configuration information corresponds to the configurationVersion field in the Avs3ConfigurationBox. In an example, when a decoder (e.g., a device where a client is located) cannot identify the version configuration information, the decoder does not decode the video bit stream in the video track.

In the above embodiments, the names and descriptions of the fields are only exemplary and explanatory. On the premise of realizing the functions defined by the above fields, the names and descriptions of the fields may be set depending on actual situations. set, all of which shall fall within the scope of protection of this disclosure.

To sum up, in the technical solutions provided in the embodiments of this disclosure, a plurality of pieces of information indicating different coding characteristics are added in the configuration information of the video bit stream, to enrich the content of the configuration information, indicate the coding characteristics from multiple dimensions, and fully consider the influencing factors of the video bit stream. Moreover, in the embodiments of this disclosure, different values are assigned to some information in the configuration information, to indicate different coding characteristics. In addition, in the embodiments of this disclosure, the values of some information in the configuration information may be represented by unsigned integers, so that the content of the configuration information can be read quickly. Since the unsigned integers occupy small memory, the embodiments of this disclosure also reduce the storage space occupied by the configuration information.

After a server performs processing such as encoding and encapsulation on a video sequence, the server may transmit a video file obtained by the encapsulation to a client. The client performs processing such as decapsulation and decoding on the received video file and plays the decoded video file. The manner in which the server transmits the video file to the client is not limited in the embodiments of this disclosure. In an example, the server actively transmits the video file to the client. For example, the server respectively encapsulates video tracks of a target video to obtain a plurality of video files, and transmits the plurality of video files to the client. Alternatively, the server transmits the video file to the client after receiving a video obtaining request from the client. For example, after receiving the video obtaining request from the client, the server respectively encapsulates video tracks of a target video to obtain a plurality of video files, and transmits the plurality of video files to the client. Alternatively, the server encapsulates a video track of a target video to obtain a video file and transmits the video file to the client. In the following, a method for transmitting a video file to a client is described using an example where a server encapsulates a video track of a target video to obtain a video file and transmits the video file to a client.

In an example, the above method further includes the following steps:

In a first step, a video obtaining request is received from a client, the video obtaining request being used for requesting to obtain a video file of a target video.

When the client needs to play the target video, the client may transmit the video obtaining request to the server, to request the video file of the target video. The content of the video obtaining request is not limited in the embodiments of this disclosure. In an example, the video obtaining request includes at least one of: a model of a device where the client is located, an identifier of the target video, an identifier of the client, or a network status of the device where the client is located.

In a second step, playback capability information of the device is determined where the client is located.

After receiving the video obtaining request from the client, the server may further determine the playback capability information of the device where the client is located. The playback capability information refers to a capability of the client to play the target video. The manner in which the server determines the playback capability information of the device where the client is located is not limited in the embodiments of this disclosure. In an example, the server determines the playback capability information of the device where the client is located according to the video obtaining request of the client. For example, the server may determine the playback capability information of the device where the client is located according to the model of the device where the client is located in the video obtaining request. Alternatively, after receiving the video obtaining request, the server transmits an information obtaining request to the client to request the playback capability information of the device where the client is located, and the client transmits the playback capability information to the server after receiving the information obtaining request.

The content of the playback capability information is not limited in the embodiments of this disclosure. In an example, the playback capability information includes at least one of: decoding capability information, presentation capability information, or network status information. The decoding capability information is used for indicating a capability of the device where the client is located to decode a video file. The presentation capability information is used for indicating a capability of the device where the client is located to present a video file. The network status information is used for indicating a network status of the device where the client is located.

In a third step, a video track matching with the playback capability information is obtained according to configuration information in each video track of the target video.

The configuration information in the video track may be used for indicating the coding characteristic of the video bit stream. Video bit streams that can be processed by devices with different playback capabilities may be different. In order to enable the device where the client is located to achieve a good video playback effect, in the embodiments of this disclosure, the server obtains the video track matching with the playback capability information of the device where the client is located according to configuration information in each video track of the target video, so as to ensure that subsequently the device where the client is located can successfully play the target video and achieve a good playback effect within the reach of its playback capability.

A specific implementation of step 545 is not limited in the embodiments of this disclosure. In an example, step 545 includes: obtaining a configuration mapping relationship, the configuration mapping relationship including a correspondence between the configuration information and the playback capability information; and determining the video track where the configuration information corresponding to the playback capability information is located in the video tracks of the target video as the video track matching with the playback capability information based on the configuration mapping relationship. That is to say, for each video track of the target video, the server pre-stores the playback capability information corresponding to the video track. Therefore, after determining the playback capability information of the device where the client is located, the server may obtain corresponding configuration information from the pre-stored configuration mapping relationship, and determine the video track where the configuration information is located as the video track matching with the playback capability information. In another example, step 545 includes: obtaining capability reference information, the capability reference information being used for indicating a corresponding condition of the configuration information; and determining the video track matching with the playback capability information based on the capability reference information and the playback capability information. Exemplarily, the capability reference information pre-stored by the server includes a bandwidth threshold, a CPU model, a frame rate threshold, a profile threshold, etc., and the playback capability information of the device where the client is located includes network bandwidth. The server compares the network bandwidth of the device where the client is located with the pre-stored bandwidth threshold; if the network bandwidth is greater than the bandwidth threshold, determines a video track 1 of the target video as the video track matching with the playback capability information; and if the network bandwidth is less than the bandwidth threshold, determines a video track 2 of the target video as the video track matching with the playback capability information.

In a fourth step, the video track matching with the playback capability information is encapsulated to obtain the video file.

The server encapsulates the video track matching with the playback capability information to obtain the video file. In an example, for a certain video, the server may respectively encode and encapsulate a video sequence, audio, subtitles, etc. corresponding to the video, to obtain a video track, an audio track, a subtitle track, etc., and then the server may encapsulate these tracks to obtain a video file.

In a fourth step, the video file is transmitted to the client.

The server transmits the video file to the client in response to the video obtaining request of the client.

To sum up, in the technical solutions provided in the embodiments of this disclosure, the server obtains the video track matching with the playback capability information of the device where the client is located, encapsulates the video track, and transmits the encapsulated video track to the client. Compared with the method where the server respectively encapsulates and all the video tracks and transmits all the video files obtained by the encapsulation to the client. the embodiments of this disclosure reduce the processing overheads of the server, and reduce the amount of data transmission between the server and the device where the client is located, thereby improving the transmission efficiency of video files. In addition, because the configuration information in the video track may be used for indicating the coding characteristic of the video bit stream, and video bit streams that can be processed by devices with different playback capabilities may be different, in the embodiments of this disclosure, the server obtains the video track matching with the playback capability information of the device where the client is located according to configuration information in each video track of the video, so as to ensure that subsequently the device where the client is located can successfully play the video and achieve a good playback effect within the reach of its playback capability.

Figure 6:
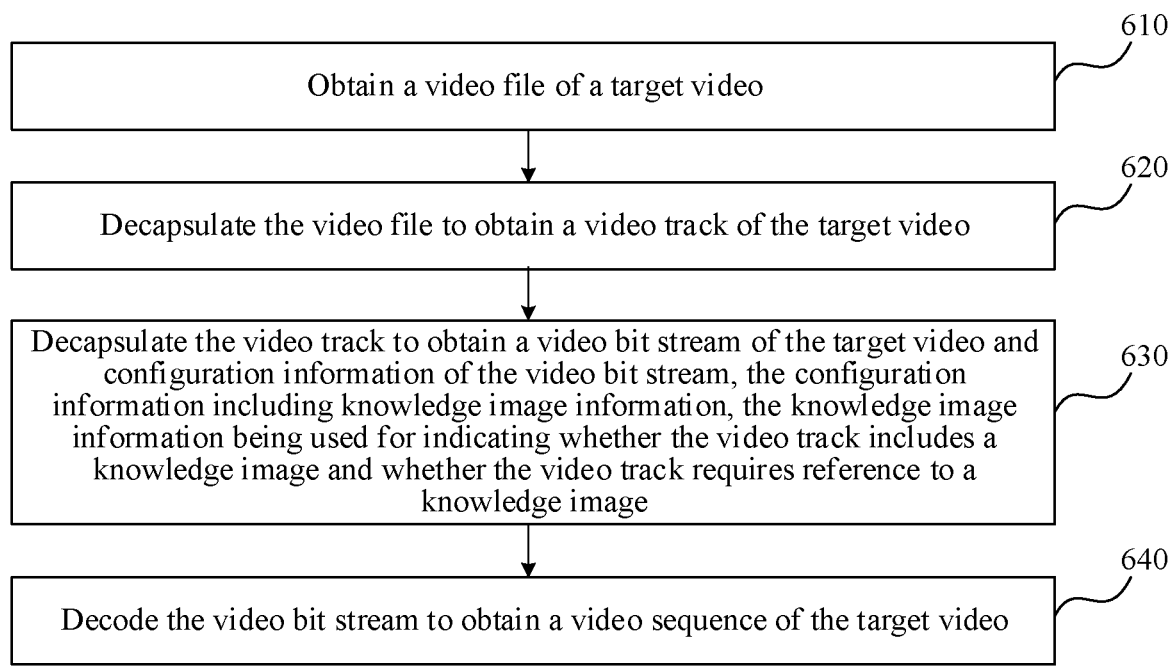
FIG. 6 is a flowchart of a video processing method according to another embodiment of this disclosure.

FIG. 6 is a flowchart of a video processing method according to an embodiment of this disclosure. The method may be applied to a computer device for decoding a video sequence such as a server or a terminal, for example, the second device 320 in the communication system shown in FIG. 3. The method may include the following steps (step 610 to step 640).

In step 610, a video file of a target video is obtained.

When a client needs to play the target video, the client may obtain the video file of the target video from a server. For the process of obtaining the video file of the target video by the client, reference may be made to the above method embodiments, and the details will not be repeated here.

In step 620, the video file is decapsulated to obtain a video track of the target video.

After receiving the video file, the client decapsulates the video file to obtain the video track of the target video.

In step 630, the video track is decapsulated to obtain a video bit stream of the target video and configuration information of the video bit stream, the configuration information being used for indicating a coding characteristic of the video bit stream, the configuration information including knowledge image information, the knowledge image information being used for indicating whether the video track includes a knowledge image and whether the video track requires reference to a knowledge image. In an example, the configuration information includes reference image information. The reference image information indicates (i) whether the video track includes a reference image and (ii) whether the video track requires reference to the reference image.

The client may further decapsulate the video track, to obtain the video bit stream of the target video and the configuration information of the video bit stream.

In an example, in response to a value of the knowledge image information being a first value, the knowledge image information is used for indicating that the video track does not include a knowledge image and the video track does not require reference to a knowledge image; in response to the value of the knowledge image information being a second value, the knowledge image information is used for indicating that the video track does not include a knowledge image and the video track requires reference to a knowledge image; in response to the value of the knowledge image information being a third value, the knowledge image information is used for indicating that the video track includes a knowledge image and the video track does not require reference to a knowledge image; and in response to a value of the knowledge image information being a fourth value, the knowledge image information is used for indicating that the video track includes a knowledge image and the video track requires reference to knowledge image.

In an example, the configuration information further includes at least one of: profile label information, used for indicating a profile that the video bit stream conforms to; level label information, used for indicating a level that the video bit stream conforms to; chroma format information, used for indicating a chroma format of the video bit stream; sample precision information, used for indicating precision of a luminance sample and a chroma sample of the video bit stream; or frame rate indication information, used for indicating a frame rate of the video bit stream.

In another example, the configuration information further includes version configuration information, the version configuration information being used for indicating a current configuration version of the video bit stream.

In step 640, the video bit stream is decoded to obtain a video sequence of the target video.

The client may further decode the video bit stream to obtain the video sequence of the target video. Then the client may play the target video according to the video sequence.

It is to be understood that steps 610 to 640 are operations executed by the decoder end, and may be regarded as an inverse process of the operations executed by the encoder end. Therefore, for the description of steps 610 to 640, reference may be made to the above embodiments, and the details will not be repeated here.

To sum up, in the technical solutions provided in the embodiments of this disclosure, after a video file is obtained through a client, processing such as decapsulation is performed on the video file to obtain a video track, the video track including configuration information of a video bit stream to indicate a coding characteristic of the video bit stream, so that the client can decode the video bit stream with reference to the coding characteristic of the video bit stream, thereby ensuring the success rate of decoding. In addition, in the embodiments of this disclosure, the configuration information of the video bit stream includes knowledge image information. Since the concept of knowledge image is first introduced for video coding in the AVS technology, the embodiments of this disclosure provide a file encapsulation method indicating a coding characteristic of the AVS encoding technology for the AVS technology.

Figure 7:
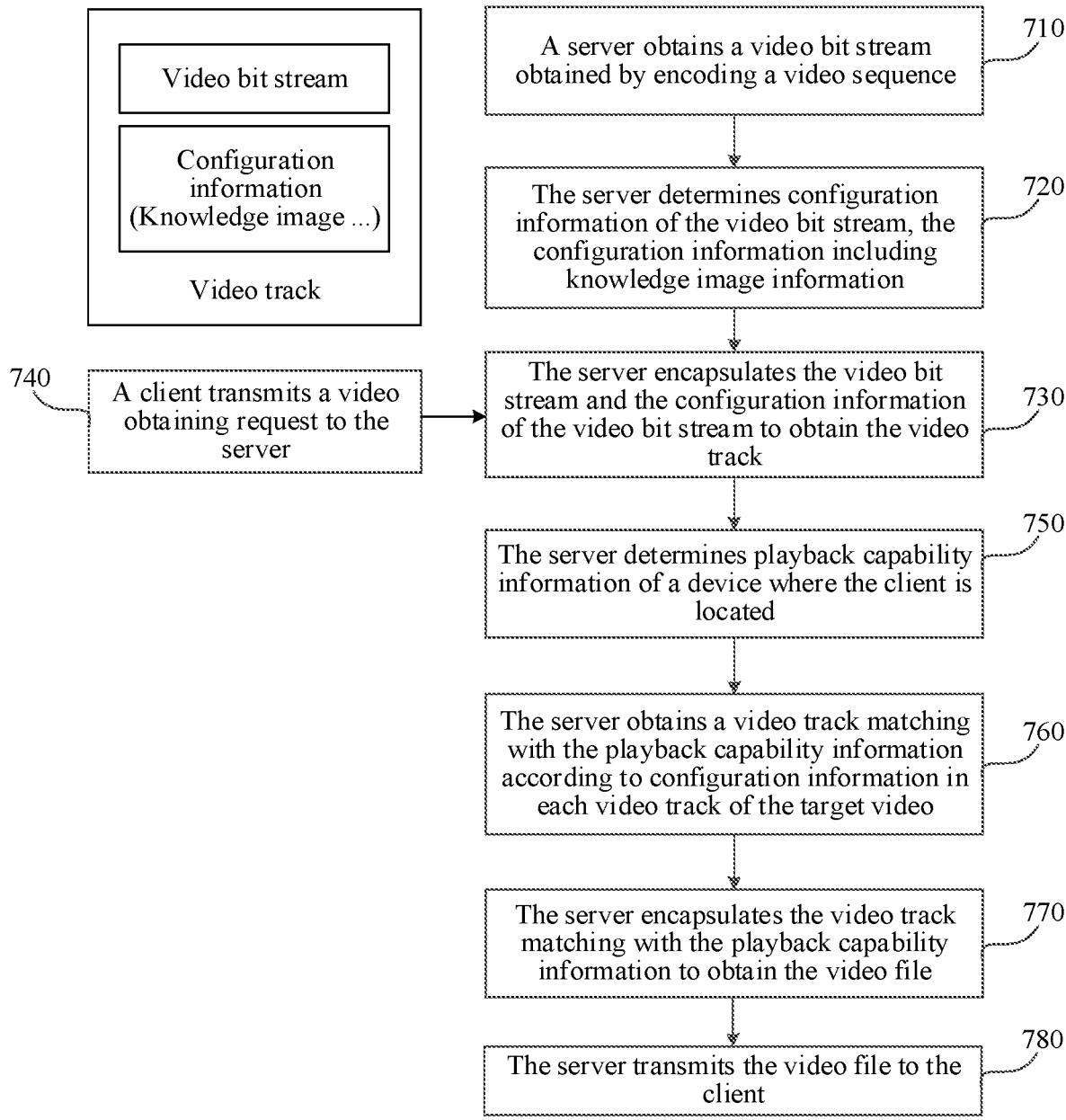
FIG. 7 is a flowchart of a video processing method according to still another embodiment of this disclosure.

FIG. 7 is a flowchart of a video processing method according to an embodiment of this disclosure. The method may be applicable to the communication system shown in FIG. 3. The method may include the following steps.

In step 710, a server obtains a video bit stream obtained by encoding a video sequence.

In step 720, the server determines configuration information of the video bit stream, the configuration information being used for indicating a coding characteristic of the video bit stream, and the configuration information including knowledge image information. The knowledge image information is used for indicating whether a video track corresponding to the video bit stream includes a knowledge image and whether the video track requires reference to a knowledge image.

In step 730, the server encapsulates the video bit stream and the configuration information of the video bit stream to obtain the video track.

In step 740, a client transmits a video obtaining request to the server. The video obtaining request is used for requesting a video file of a target video.

In step 750, the server determines playback capability information of a device where the client is located. In an example, the playback capability information includes at least one of: decoding capability information, presentation capability information, or network status information.

In step 760, the server obtains a video track matching with the playback capability information according to configuration information in each video track of the target video.

In step 770, the server encapsulates the video track matching with the playback capability information to obtain the video file.

In step 780, the server transmits the video file to the client.

The technical solutions of this disclosure will be described below using several examples.

Example 1

The server encapsulates video bit streams with the same content but different decoding and presentation requirements into different tracks. The different decoding and presentation requirements include different profiles, levels, chroma formats, sample precisions, etc. In this example, different profiles are used as an example.

Assume that the server respectively encodes and encapsulates video content A into video track 1, video track 2, and video track 3 according to the main 8-bit profile, the main 10-bit profile, and the high-performance 10-bit profile. then:
Video track 1: track_ID=1; profile_id=0x20;
Video track 2: track_ID=2; profile_id=0x22;
Video track 3: track_ID=3; profile_id=0x32.

The server receives a request from the client, encapsulates the video track matching with decoding and presentation capabilities of the client, and the encapsulated video track to the client.

For client A: Video file 1 is received, decoded and consumed. The video file 1 is decapsulated to obtain the video track track_ID=1; profile_id=0x20.

For client B: Video file 2 is received, decoded and consumed. The video file 2 is decapsulated to obtain the video track track_ID=2; profile_id=0x22.

Example 2

The server encapsulates video bit streams with the same content but different frame rates into different video tracks.

Assume that the server respectively encapsulates video bit streams with a frame rate of 30 frames per second (FPS) and a frame rate of 60 FPS for video content A into video track 1 and video track 2.
Video track 1: track_ID=1; frame_rate_code=0101;
Video track 2: track_ID=2; frame_rate_code=1000.

The server receives a request from the client, encapsulates the video track matching with decoding and presentation capabilities of the client, and the encapsulated video track to the client.

For client A: A network of the device where client A is located is stuck. Video file 1 is received, decoded and consumed. The video file 1 is decapsulated to obtain the video track track_ID=1; frame_rate_code=0101, where the video frame rate is 30 FPS.

For client B: A network of the device where client B is located is smooth. Video file 2 is received, decoded and consumed. The video file 2 is decapsulated to obtain the video track track_ID=2; frame_rate_code=1000, where the video frame rate is 60 FPS.

Example 3

For video content A, assume:
Video track 1: track_ID=1, library_indication=10;
Video track 2: track_ID=2, library_indication=00.
For video content B, assume:
Video track 1: track_ID=1, library_indication=10;
Video track 2: track_ID=2, library_indication=01.

When the client requests the video content A, the server encapsulates the video track 1 and the video track 2 together into a video file and transmits the video file to the client based on, or when, the network of the device where the client is located is smooth.

When the client requests the video content A, the server encapsulates the video track 2 into a video file and transmits the video file to the client based on, or when. the network of the device where the client is located is stuck.

When the client requests the video content B, the server encapsulates the video track 1 and the video track 2 together into a video file and transmits the video file to the client, regardless of the network status of the device where the client is located.

After the client receives the video file A, the client does not need to apply for additional decoding resources (memory, central processing unit (CPU), etc.), because the video file obtained through decapsulation does not include a video track relying on a knowledge image.

After the client receives the video file B, the client needs to apply for additional decoding resources (memory, CPU, etc.), because the video file obtained through decapsulation includes a video track relying on a knowledge image.

The following is an apparatus embodiment of this disclosure, which can be configured to execute the method embodiments of this disclosure. For details not disclosed in the apparatus embodiments of this disclosure, refer to the method embodiments of this disclosure.

Figure 8:
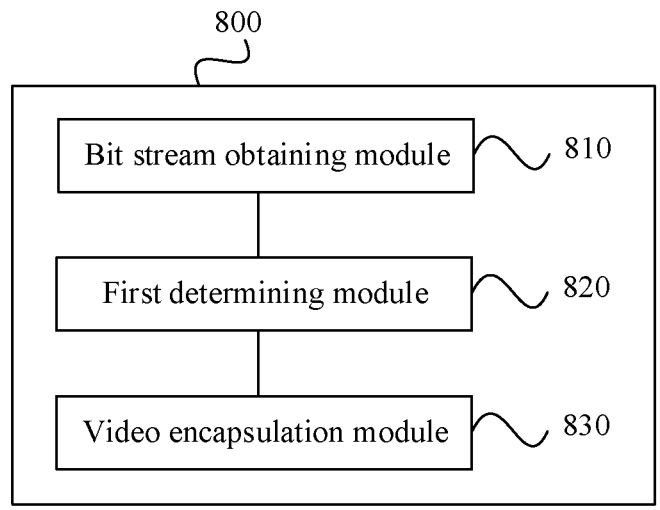
FIG. 8 is a block diagram of a video processing apparatus according to an embodiment of this disclosure.

FIG. 8 is a block diagram of a video processing apparatus according to an embodiment of this disclosure. The apparatus has a function of implementing the above example of the video processing method, and the function may be implemented by hardware or by executing corresponding software by hardware. The apparatus may be the computer device for encoding a video sequence described above, or may be provided in the computer device for encoding a video sequence. The apparatus 800 may include: a bit stream obtaining module 810, a first determining module 820, and a track encapsulation module 830. One or more modules, submodules, and/or units of the apparatus can be implemented by processing circuitry, software, or a combination thereof, for example.

The bit stream obtaining module 810 is configured to obtain a video bit stream obtained by encoding a video sequence.

The first determining module 820 is configured to determine configuration information of the video bit stream, the configuration information including knowledge image information, the knowledge image information being used for indicating whether a video track corresponding to the video bit stream includes a knowledge image and whether the video track requires reference to a knowledge image.

The track encapsulation module 830 is configured to encapsulate the video bit stream and the configuration information to obtain the video track.

In an example, in response to a value of the knowledge image information being a first value, the knowledge image information is used for indicating that the video track does not include a knowledge image and the video track does not require reference to a knowledge image; in response to the value of the knowledge image information being a second value, the knowledge image information is used for indicating that the video track does not include a knowledge image and the video track requires reference to a knowledge image; in response to the value of the knowledge image information being a third value, the knowledge image information is used for indicating that the video track includes a knowledge image and the video track does not require reference to a knowledge image; and in response to a value of the knowledge image information being a fourth value, the knowledge image information is used for indicating that the video track includes a knowledge image and the video track requires reference to knowledge image.

In an example, the first determining module 820 is configured to: determine the knowledge image information based on a video content of the video bit stream.

In an example, the configuration information further includes at least one of: profile label information, used for indicating a profile that the video bit stream conforms to; level label information, used for indicating a level that the video bit stream conforms to; chroma format information, used for indicating a chroma format of the video bit stream; sample precision information, used for indicating precision of a luminance sample and a chroma sample of the video bit stream; or frame rate indication information, used for indicating a frame rate of the video bit stream.

In an example, the configuration information further includes version configuration information, the version configuration information being used for indicating a current configuration version of the video bit stream.

In an example, the bit stream obtaining module 810 is configured to: obtain coding capability information, the coding capability information being used for indicating a coding capability of a coding device for a video sequence; determine a coding policy according to the coding capability information; and code the video sequence according to the coding policy to obtain the video bit stream.

Figure 9:
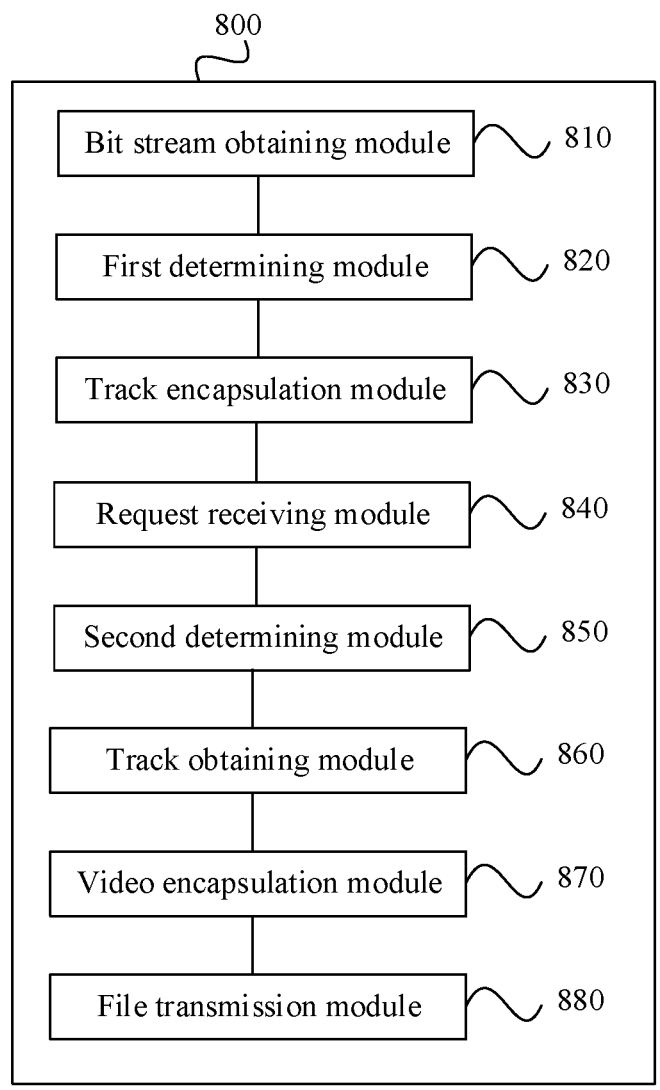
FIG. 9 is a block diagram of a video processing apparatus according to another embodiment of this disclosure.

In an example, as shown in FIG. 9, the apparatus 800 further includes: a request receiving module 840, configured to receive a video obtaining request from a client, the video obtaining request being used for requesting to obtain a video file of a target video; a second determining module 850, configured to determine playback capability information of a device where the client is located; a track obtaining module 860, configured to obtain a video track matching with the playback capability information according to configuration information in each video track of the target video; a video encapsulation module 870, configured to encapsulate encapsulating the video track matching with the playback capability information to obtain the video file; and a file transmission module 880, configured to transmit the video file to the client.

In an example, as shown in FIG. 9, the track obtaining module 860 is configured to: obtain a configuration mapping relationship, the configuration mapping relationship including a correspondence between the configuration information and the playback capability information; and determine the video track where the configuration information corresponding to the playback capability information is located in the video tracks of the target video as the video track matching with the playback capability information based on the configuration mapping relationship.

In an example, the playback capability information includes at least one of: decoding capability information, used for indicating a capability of the device where the client is located to decode a video file; presentation capability information, used for indicating a capability of the device where the client is located to present a video file; or network status information, used for indicating a network status of the device where the client is located.

To sum up, in the technical solutions provided in the embodiments of this disclosure, in the process of encapsulating a video bit stream to obtain a video track, configuration information of the video bit stream is added to indicate a coding characteristic of the video bit stream, so as to facilitate the classification and storage of the video track, the association between different video tracks, and the quick obtaining of the video track with a certain coding characteristic, thereby improving the storage, association, and transmission efficiency of video tracks. In addition, since each video track includes the configuration information of the video bit stream, the server can quickly obtain a video track matching with the playback capability of the device where the client is located according to the configuration information, encapsulate the video track, and transmit the encapsulated video track to the client. Because the video track matches with the playback capability of the device where the client is located, the success rate of decoding can be ensured, thereby improving the decoding efficiency. In addition, in the embodiments of this disclosure, the configuration information of the video bit stream includes knowledge image information. Since the concept of knowledge image is first introduced for video coding in the AVS technology, the embodiments of this disclosure provide a file encapsulation method indicating a coding characteristic of the AVS encoding technology for the AVS technology.

Figure 10:
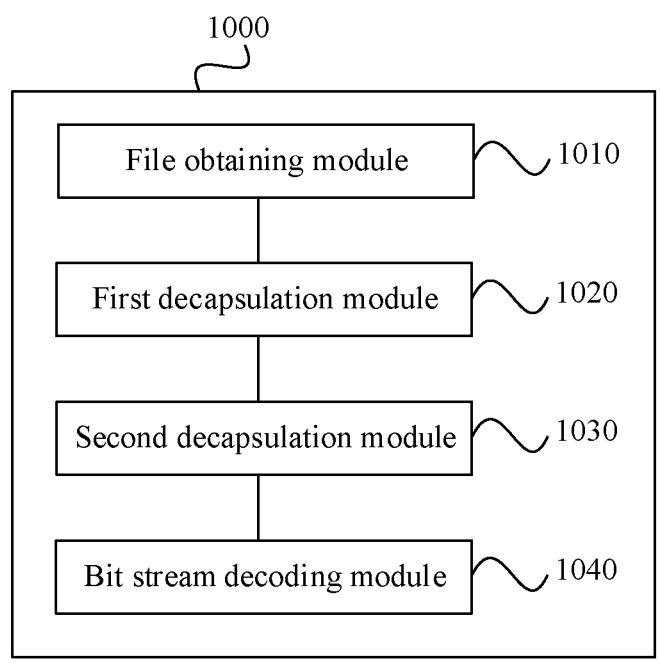
FIG. 10 is a block diagram of a video processing apparatus according to still another embodiment of this disclosure.

FIG. 10 is a block diagram of a video processing apparatus according to an embodiment of this disclosure. The apparatus has a function of implementing the above example of the video processing method, and the function may be implemented by hardware or by executing corresponding software by hardware. The apparatus may be the device where the client is located as described above, or may be provided in the device where the client is located. The apparatus 1000 may include: a file obtaining module 1010, a first decapsulation module 1020, a second decapsulation module 1030, and a bit stream decoding module 1040. One or more modules, submodules, and/or units of the apparatus can be implemented by processing circuitry, software, or a combination thereof, for example.

The file obtaining module 1010 is configured to obtain a video file of a target video.

The first decapsulation module 1020 is configured to decapsulate the video file to obtain a video track of the target video.

The second decapsulation module 1030 is configured to decapsulate the video track to obtain a video bit stream of the target video and configuration information of the video bit stream, the configuration information being used for indicating a coding characteristic of the video bit stream, the configuration information including knowledge image information, the knowledge image information being used for indicating whether the video track includes a knowledge image and whether the video track requires reference to a knowledge image.

The bit stream decoding module 1040 is configured to decode the video bit stream to obtain a video sequence of the target video.

In an example, in response to a value of the knowledge image information being a first value, the knowledge image information is used for indicating that the video track does not include a knowledge image and the video track does not require reference to a knowledge image; in response to the value of the knowledge image information being a second value, the knowledge image information is used for indicating that the video track does not include a knowledge image and the video track requires reference to a knowledge image; in response to the value of the knowledge image information being a third value, the knowledge image information is used for indicating that the video track includes a knowledge image and the video track does not require reference to a knowledge image; and in response to a value of the knowledge image information being a fourth value, the knowledge image information is used for indicating that the video track includes a knowledge image and the video track requires reference to knowledge image.

In an example, the configuration information further includes at least one of: profile label information, used for indicating a profile that the video bit stream conforms to; level label information, used for indicating a level that the video bit stream conforms to; chroma format information, used for indicating a chroma format of the video bit stream; sample precision information, used for indicating precision of a luminance sample and a chroma sample of the video bit stream; or frame rate indication information, used for indicating a frame rate of the video bit stream.

In an example, the configuration information further includes version configuration information, the version configuration information being used for indicating a current configuration version of the video bit stream.

To sum up, in the technical solutions provided in the embodiments of this disclosure, after a video file is obtained through a client, processing such as decapsulation is performed on the video file to obtain a video track, the video track including configuration information of a video bit stream to indicate a coding characteristic of the video bit stream, so that the client can decode the video bit stream with reference to the coding characteristic of the video bit stream, thereby ensuring the success rate of decoding. In addition, in the embodiments of this disclosure, the configuration information of the video bit stream includes knowledge image information. Since the concept of knowledge image is first introduced for video coding in the AVS technology, the embodiments of this disclosure provide a file encapsulation method indicating a coding characteristic of the AVS encoding technology for the AVS technology.

When the apparatus provided by the above embodiments implements its functions, the description is given by taking the above division of functional modules as an example. In practice, the above functions may be assigned to be implemented by different functional modules according to needs, i.e., the internal structure of the apparatus may be divided into different functional modules to implement all or part of the functions described above. In addition, the apparatus and method embodiments provided in the foregoing embodiments belong to one conception. For the specific implementation process, reference may be made to the method embodiments, and details are not described herein again.

In the above embodiments, the computer device for encoding a video sequence may be implemented as a server or a terminal, and the device where the client is located may be implemented as a server or a terminal. The structures of the server and the terminal will be described below respectively.

Figure 11:
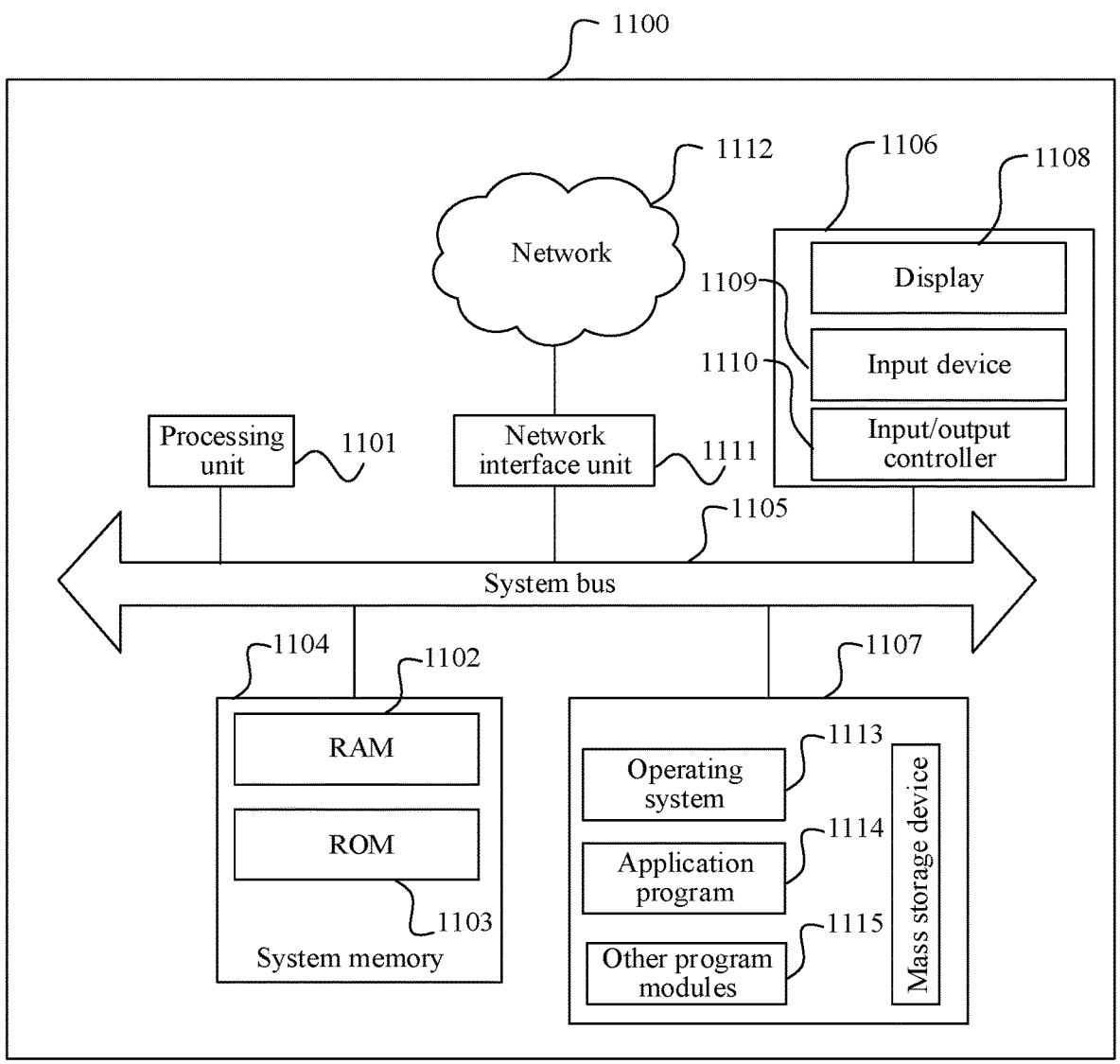
FIG. 11 is a structural block diagram of a server according to an embodiment of this disclosure.

FIG. 11 is a structural block diagram of a server according to an embodiment of this disclosure. The server may be configured to execute the video processing method described in the embodiment in FIG. 5, and may also be configured to execute the video processing method described in the embodiment in FIG. 6. In an example, the server 1100 includes a central processing unit (CPU) 1101, a system memory 1104 including a random access memory (RAM) 1102 and a read-only memory (ROM) 1103, and a system bus 1105 connecting the system memory 1104 and the central processing unit 1101. The server 1100 further includes a basic input/output (I/O) system 1106 assisting in transmitting information between devices in a computer, and a mass storage device 1107 configured to store an operating system 1113, an application program 1114, and another program module 1115.

The basic I/O system 1106 includes a display 1108 configured to display information, and an input device 1109 configured to allow a user to enter information, for example, a mouse or a keyboard. The display 1108 and the input device 1109 are both connected to the CPU 1101 by using an I/O controller 1110 that is connected to the system bus 1105. The basic I/O system 1106 may further include the I/O controller 1110 configured to receive and process input from a plurality of other devices such as a keyboard, a mouse, or an electronic stylus. Similarly, the I/O controller 1110 further provides an output to a display screen, a printer, or another type of output device.

The large-capacity storage device 1107 is connected to the CPU 1101 by using a large-capacity storage controller (not shown) connected to the system bus 1105. The mass storage device 1107 and a computer-readable medium associated with the mass storage device 1107 provide non-volatile storage for the server 1100. That is, the mass storage device 1107 may include a computer-readable medium (not shown) such as a hard disk or a compact disc ROM (CD-ROM) drive.

Without loss of generality, the computer-readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art can know that the computer storage medium is not limited to the foregoing several types. The system memory 1104 and the mass storage device 1107 may be collectively referred to as a memory.

According to various embodiments of this disclosure, the server 1100 may further be connected, by using a network such as the Internet, to a remote computer on the network and run. That is, the server 1100 may be connected to a network 1112 by using a network interface unit 1111 that is connected to the system bus 1105, or may be connected to a network of another type or a remote computer system (not shown) by using the network interface unit 1111.

The memory further includes a computer program. The computer program is stored in the memory and is configured to be executed by one or more processors, to implement the video processing method according to the embodiment shown in FIG. 5 or implement the video processing method according to the embodiment shown in FIG. 6.

Figure 12:
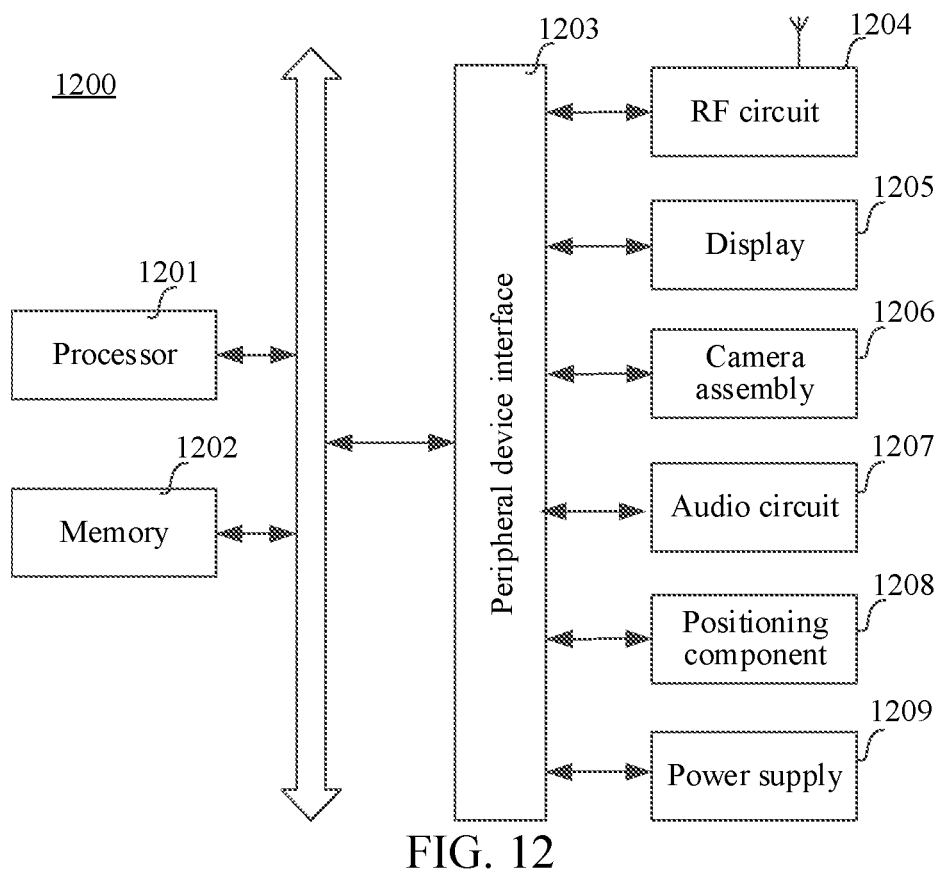
FIG. 12 is a structural block diagram of a terminal according to an embodiment of this disclosure.

FIG. 12 is a structural block diagram of a terminal 1200 according to an embodiment of this disclosure. The terminal 1200 may be an electronic device such as a mobile phone, a tablet computer, a multimedia playing device, a television, a projector, a display, a wearable device, or a PC. The terminal may be configured to implement the video processing method described in the embodiment in FIG. 5, and may also be configured to implement the video processing method described in the embodiment in FIG. 6. For example, the terminal 1200 includes a processor 1201 and a memory 1202.

The processor 1201 may include one or more processing cores, and may be, for example, a 4-core processor or an 8-core processor. The processor 1201 may be implemented by using at least one hardware form of a digital signal processor (DSP), a field-programmable gate array (FPGA), or a programmable logic array (PLA). The processor 1201 may also include a main processor and a coprocessor. The main processor is a processor configured to process data in an awake state, and is also referred to as CPU. The coprocessor is a low power consumption processor configured to process data in a standby state. In some embodiments, a graphics processing unit (GPU) may be integrated into the processor 1201. The GPU is configured to be responsible for rendering and drawing content to be displayed on a display. In some embodiments, the processor 1201 may further include an artificial intelligence (AI) processor. The AI processor is configured to process a calculation operation related to machine learning.

The memory 1202 may include one or more computer-readable storage media that may be non-transitory. The memory 1202 may further include a high-speed random access memory and a non-transitory memory, for example, one or more magnetic disk storage devices or flash storage devices. In some embodiments, the non-transitory computer-readable storage medium in the memory 1202 is configured to store at least one instruction, at least one program, a code set, or an instruction set. The at least one instruction, the at least one program, the code set, or the instruction set is configured to be executed by one or more processors to implement the video processing method described in the embodiment in FIG. 5 or implement the video processing method described in the embodiment in FIG. 6.

In some embodiments, the terminal 1200 may further include: a peripheral device interface 1203 and at least one peripheral device. The processor 1201, the memory 1202, and the peripheral device interface 1203 may be connected by a bus or a signal line. Each peripheral device may be connected to the peripheral device interface 1203 by a bus, a signal line, or a circuit board. Specifically, the peripheral device includes: at least one of a radio frequency circuit 1204, a touch display 1205, a camera assembly 1206, an audio circuit 1207, a positioning assembly 1208, or a power supply 1209.

A person skilled in the art may understand that the structure shown in FIG. 12 does not constitute a limitation to the terminal 1200, and the terminal may include more or fewer components than those shown in the figure, or some components may be combined, or a different component arrangement may be used.

In an exemplary embodiment, a computer-readable storage medium, such as a non-transitory computer-readable storage medium, is further provided. The computer-readable storage medium stores at least one instruction, at least one program, a code set, or an instruction set, the at least one instruction, the at least one program, the code set, or the instruction set being executed by a processor of a computer device to implement the video processing method.

The computer-readable storage medium may include: a read-only memory (ROM), a random access memory (RAM), a solid state drive (SSD), an optical disc, and the like. The random access memory may include a resistive random access memory (ReRAM) and a dynamic random access memory (DRAM).

In an exemplary embodiment, a computer program product or a computer program is further provided. The computer program product or the computer program includes computer instructions, the computer instructions being stored in a computer-readable storage medium. A processor of a computer device reads the computer instructions from the computer-readable storage medium, and executes the computer instructions, so that the computer device executes the video processing method.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

"A plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this disclosure.

The foregoing descriptions are merely exemplary embodiments of this disclosure, but are not intended to limit the scope of this disclosure. Any modification, equivalent replacement, or improvement made within the spirit and principle of this disclosure shall fall within the scope of this disclosure.

What is claimed is:

1. A video processing method, comprising:
   obtaining a video bit stream;
   determining, by processing circuitry, configuration information of the video bit stream, the configuration information including reference image information, the reference image information indicating (i) whether a first video track corresponding to the video bit stream includes a first reference image and (ii) whether the first video track requires reference to a second reference image in a second video track; and
   encapsulating the video bit stream and the configuration information to obtain the first video track, wherein
   a value of the reference image information being a first value indicates that the first video track does not include the first reference image and the first video track does not require reference to the second reference image;
   the value of the reference image information being a second value indicates that the first video track does not include the first reference image and the first video track requires reference to the second reference image;
   the value of the reference image information being a third value indicates that the first video track includes the first reference image and the first video track does not require reference to the second reference image; and the value of the reference image information being a fourth value indicates that the first video track includes the first reference image and the first video track requires reference to the second reference image.

2. The method according to claim 1, wherein the reference image information is included in an Audio Video Coding Standard (AVS) configuration data box.

3. The method according to claim 1, wherein the determining the configuration information comprises:
determining the reference image information based on a video content of the video bit stream.

4. The method according to claim 1, wherein the configuration information further includes at least one of:
profile label information that indicates a profile that the video bit stream conforms to;
level label information that indicates a level that the video bit stream conforms to;
chroma format information that indicates a chroma format of the video bit stream;
sample precision information that indicates precision of a luminance sample and a chroma sample of the video bit stream; or
frame rate indication information that indicates a frame rate of the video bit stream.

5. The method according to claim 1, wherein the configuration information further includes version configuration information that indicates a current configuration version of the video bit stream.

6. The method according to claim 1, wherein before the obtaining the video bit stream, the method further comprises:
obtaining coding capability information indicating a coding capability of a coding device for a video sequence;
determining a coding policy according to the coding capability information; and
coding the video sequence according to the coding policy to obtain the video bit stream.

7. The method according to claim 1, further comprising:
receiving, from a client device, a video obtaining request to obtain a video file of a target video;
determining playback capability information of the client device;
obtaining a video track that matches the playback capability information according to configuration information in each video track of the target video;
encapsulating the video track that matches the playback capability information to obtain the video file; and
transmitting the video file to the client device.

8. The method according to claim 7, wherein the obtaining the video track that matches the playback capability information comprises:
obtaining a configuration mapping relationship that indicates a correspondence between the configuration information and the playback capability information; and
determining the video track associated with the configuration information corresponding to the playback capability information as the video track that matches the playback capability information based on the configuration mapping relationship.

9. The method according to claim 7, wherein the playback capability information includes at least one of:
decoding capability information indicating a capability of the client device to decode the video file;
presentation capability information indicating a capability of the client device to present the video file; or
network status information indicating a network status of the client device.

10. A video processing method, comprising:
obtaining a video file of a target video;
decapsulating the video file to obtain a first video track of the target video;
decapsulating, by processing circuitry, the first video track to obtain a video bit stream of the target video and configuration information of the video bit stream, the configuration information including reference image information, the reference image information indicating (i) whether the first video track includes a first reference image and (ii) whether the first video track requires reference to a second reference image in a second video track; and
decoding the video bit stream to obtain a video sequence of the target video, wherein
a value of the reference image information being a first value indicates that the first video track does not include the first reference image and the first video track does not require reference to the second reference image;
the value of the reference image information being a second value indicates that the first video track does not include the first reference image and the first video track requires reference to the second reference image;
the value of the reference image information being a third value indicates that the first video track includes the first reference image and the first video track does not require reference to the second reference image; and
the value of the reference image information being a fourth value indicates that the first video track includes the first reference image and the first video track requires reference to the second reference image.

11. The method according to claim 10, wherein the reference image information is included in an Audio Video Coding Standard (AVS) configuration data box.

12. The method according to claim 10, wherein the configuration information further comprises at least one of:
profile label information that indicates a profile that the video bit stream conforms to;
level label information that indicates a level that the video bit stream conforms to;
chroma format information that indicates a chroma format of the video bit stream;
sample precision information that indicates precision of a luminance sample and a chroma sample of the video bit stream; or
frame rate indication information that indicates a frame rate of the video bit stream.

13. The method according to claim 10, wherein the configuration information further includes version configuration information, the version configuration information indicating a current configuration version of the video bit stream.

14. A video processing apparatus, comprising:
processing circuitry configured to:
obtain a video file of a target video;
decapsulate the video file to obtain a first video track of the target video;
decapsulate the first video track to obtain a video bit stream of the target video and configuration information of the video bit stream, the configuration information including reference image information, the reference image information indicating (i) whether the first video track includes a first reference image and (ii) whether the first video track requires reference to a second reference image in a second video track; and decode the video bit stream to obtain a video sequence of the target video, wherein a value of the reference image information being a first value indicates that the first video track does not include the first reference image and the first video track does not require reference to the second reference image;

the value of the reference image information being a second value indicates that the first video track does not include the first reference image and the first video track requires reference to the second reference image;

the value of the reference image information being a third value indicates that the first video track includes the first reference image and the first video track does not require reference to the second reference image; and the value of the reference image information being a fourth value indicates that the first video track includes the first reference image and the first video track requires reference to the second reference image.

15. A non-transitory computer-readable storage medium, storing instructions which when executed by a processor cause the processor to perform the video processing method according to claim 1.

16. A non-transitory computer-readable storage medium, storing instructions which when executed by a processor cause the processor to perform the video processing method according to claim 10.

* * * * *

UNITED STATES PATENT AND TRADEMARK OFFICE
CERTIFICATE OF CORRECTION

| | | |
|---|---|---|
| PATENT NO. | : 12,267,525 B2 | Page 1 of 1 |
| APPLICATION NO. | : 17/950619 | |
| DATED | : April 1, 2025 | |
| INVENTOR(S) | : Ying Hu et al. | |

It is certified that error appears in the above-identified patent and that said Letters Patent is hereby corrected as shown below:

On the Title Page

Item (71), the Applicant city reads as:
Guangdong (CN)

Should read as:
--Shenzhen (CN)--

Signed and Sealed this
Thirteenth Day of May, 2025

Coke Morgan Stewart
*Acting Director of the United States Patent and Trademark Office*